US009976482B2

(12) United States Patent
Reynes et al.

(10) Patent No.: US 9,976,482 B2
(45) Date of Patent: May 22, 2018

(54) ANTIFREEZE SYSTEM FOR A PIPEWORK

(71) Applicant: Airbus Operations (SAS), Toulouse (FR)

(72) Inventors: Didier Reynes, Toulouse (FR); Christophe Casse, Fenouillet (FR)

(73) Assignee: AIRBUS OPERATIONS SAS, Toulouse (FR)

(*) Notice: Subject to any disclaimer, the term of this patent is extended or adjusted under 35 U.S.C. 154(b) by 206 days.

(21) Appl. No.: 14/961,365

(22) Filed: Dec. 7, 2015

(65) Prior Publication Data
US 2016/0160759 A1    Jun. 9, 2016

(30) Foreign Application Priority Data
Dec. 8, 2014 (FR) ...................... 14 62059

(51) Int. Cl.
E03B 7/10 (2006.01)
F02C 7/047 (2006.01)
F16L 53/00 (2018.01)

(52) U.S. Cl.
CPC ............ F02C 7/047 (2013.01); F16L 53/002 (2013.01)

(58) Field of Classification Search
CPC ........ F02C 7/047; F16L 53/002; F16L 19/065
USPC ..................... 138/32, 34, 112–114
See application file for complete search history.

(56) References Cited

U.S. PATENT DOCUMENTS

| | | | |
|---|---|---|---|
| 1,140,633 A * | 5/1915 | Trucano ................ | F16L 59/065 138/148 |
| 2,930,407 A * | 3/1960 | Conley .................. | F16L 59/14 138/114 |
| 3,113,595 A * | 12/1963 | Cotman, Jr. ............ | F16L 59/13 138/113 |
| 4,014,369 A | 3/1977 | Kobres, Jr. | |
| 4,124,179 A | 11/1978 | Powell et al. | |
| 4,365,404 A | 12/1982 | Castro et al. | |
| 4,930,544 A * | 6/1990 | Ziu ........................ | F16L 7/00 138/111 |
| 5,803,127 A * | 9/1998 | Rains ..................... | F16L 7/00 138/113 |

(Continued)

FOREIGN PATENT DOCUMENTS

| | | |
|---|---|---|
| DE | 102004035955 | 3/2006 |
| DE | 202009006902 | 7/2009 |

(Continued)

OTHER PUBLICATIONS

DE102004035955 with Machine Translation.*
French Search Report, dated Mar. 13, 2015.

*Primary Examiner* — Vishal Pancholi

(74) *Attorney, Agent, or Firm* — Greer, Burns & Crain, Ltd.

(57) ABSTRACT

An antifreeze system for a pipework, the antifreeze system comprising a framework configured to be fixed to the pipework, and at least one thermally insulating sleeve maintained around the pipework by the framework. Each sleeve is configured so that a space is produced between the sleeve and the pipework. The framework has an inlet and an outlet which are configured to produce a fluid communication between the outer side of the antifreeze system and the space. The inlet is fluidly connected to a source of hot air. Such an antifreeze system thus enables a flow of hot air around the pipework which thus prevents the liquid which flows therein from freezing.

5 Claims, 2 Drawing Sheets

(56) References Cited

U.S. PATENT DOCUMENTS

2009/0145506 A1* 6/2009 Queau ................ F16L 39/005
                                                                  138/112
2013/0187007 A1   7/2013 Mackin et al.

FOREIGN PATENT DOCUMENTS

EP         2620616      4/2013
JP         2000081192   3/2000

* cited by examiner

ANTIFREEZE SYSTEM FOR A PIPEWORK

CROSS-REFERENCES TO RELATED APPLICATIONS

This application claims the benefit of the French patent application No. 1462059 filed on Dec. 8, 2014, the entire disclosures of which are incorporated herein by way of reference.

BACKGROUND OF THE INVENTION

The present invention relates to an antifreeze system for a pipework, an assembly comprising a pipework and such an antifreeze system, and an aircraft which comprises at least one such assembly.

There are numerous pipeworks which transport liquids such as water.

In some cases, in order to prevent the liquid flowing in a pipework from freezing, heating elements of the electrical resistance type, and temperature sensors are arranged along the pipework. When a temperature sensor detects that the temperature of the liquid is becoming too low at the risk of causing it to freeze, it controls at least one of the heating elements so that they heat the liquid.

In the case of an aircraft, there are a large number of pipeworks to monitor, which brings about the positioning of a large number of temperature sensors and heating elements. These different elements are relatively costly and heavy which is disadvantageous in terms of the cost of use and weight of the aircraft.

SUMMARY OF THE INVENTION

An object of the present invention is to provide an antifreeze system which does not have the disadvantages of the prior art and which in particular enables a gain in weight savings relative to current installations.

To this end, there is proposed an antifreeze system for a pipework, the antifreeze system comprising:
 a framework which is intended to be fixed to the pipework,
 a source of hot air and
 at least one thermally insulating sleeve which is maintained around the pipework by the framework, the or each sleeve being configured so that a space is produced between the sleeve and the pipework,
 the framework having an inlet and an outlet, which are configured to produce a fluid communication between the outer side of the antifreeze system and the space, and where the inlet is fluidly connected to the source of hot air,
 wherein the framework has two end supports, each comprising a hole which constitutes for one the inlet and for the other the outlet, and, for each pair of sleeves, an intermediate support which is arranged between the two sleeves and which has at least one air duct which is configured to enable the passage of the hot air from one end support to the other end support.

Such an antifreeze system enables hot air to be passed around the pipework, which enables the liquid which flows therein to be kept at a sufficiently high temperature to avoid freezing.

Advantageously, the intermediate support comprises:
 a collar which is intended to be fitted on the pipework,
 a base which is fixedly joined to the collar and which extends around the collar,
 a lateral wall which is formed by means of revolution and which is fixedly joined to the base and which extends at one side and the other of the base parallel with the axis of the collar, and
 at one side and the other of the base, an intermediate wall which is fixed to the base between the lateral wall and the collar,
 and each air duct is arranged in the base between the intermediate wall and the collar.

Advantageously, the sleeve comprises a tube and studs which are arranged radially at the inner side of the tube.

Advantageously, each end support comprises:
 a collar which is intended to be fitted on the pipework,
 a base which is fixedly joined to the collar and which extends around the collar,
 a lateral wall which is formed by means of revolution and which is fixedly joined to the base and which extends from the base parallel with the axis of the collar, and
 a ring which is fixed to the inner side of the lateral wall and which is remote from the base and whose inner circle constitutes a free edge,
 and the hole opens inside the lateral wall between the base and the ring.

The invention also proposes an assembly which comprises a pipework and an antifreeze system according to one of the preceding variants, of which the framework is fixed to the pipework and of which each sleeve is maintained around the pipework.

The invention also proposes an aircraft which comprises a jet engine which is provided with a tap which is configured to draw hot air from the jet engine, an assembly according to the preceding variant and wherein the source of hot air is a pipework which extends from the tap.

BRIEF DESCRIPTION OF THE DRAWINGS

The features of the invention mentioned above and other features will be appreciated more clearly from a reading of the following description of an embodiment, the description being given with reference to the appended drawings, in which.

DETAILED DESCRIPTION OF THE PREFERRED EMBODIMENTS

Figure 1:
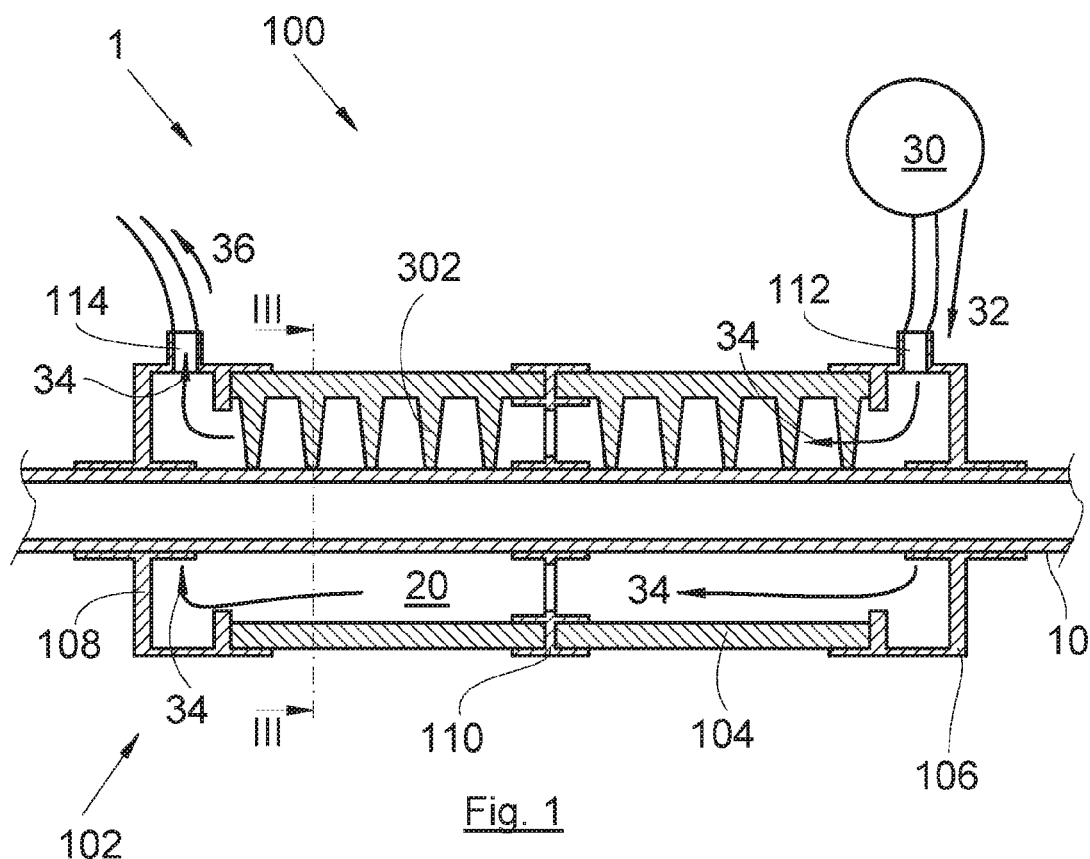
FIG. 1 is a section view of an assembly according to the invention comprising an antifreeze system.

FIG. 1 shows an assembly 1 comprising a pipework 10 in which a liquid flows, such as water, and an antifreeze system 100.

The antifreeze system 100 comprises a framework 102 which is fixed to the pipework 10, and at least one sleeve 104 which is thermally insulating and which is maintained around the pipework 10 by the framework 102.

To this end, the framework 102 has fixing means which ensure that it is fixed to the pipework 10.

The antifreeze system 10 comprises a first and a second end and in this instance is generally in the form of a cylinder.

In the embodiment of the invention set out in this instance, there are two consecutive sleeves 104, but it is possible to place only one of them or to place more than two of them along the length of the pipework 10 to be protected."

The sleeve 104 is configured so that a space 20 is produced between the sleeve 104 and the pipework 10; to this end, the inner diameter of the sleeve 104 is greater than the outer diameter of the pipework 10.

The framework 102 has an inlet 112 at the first end and an outlet 114 at the second end. The inlet 112 and the outlet 114 are configured to produce a fluid communication between the outer side of the antifreeze system 100 and the space 20, that is to say, the inner side of the sleeve 104.

The inlet 112 is fluidly connected to a source 30 of hot air in terms of movement, in this instance by means of a pipe. The air is said to be hot when it has a temperature which is sufficient to prevent the liquid flowing in the pipework from freezing.

The operation of the antifreeze system 100 is as follows:
the hot air is sent by the source 30 of hot air through the inlet 112 (arrow 32),
the hot air moves inside the sleeve 104 passing through the space 20 and surrounding the pipework 10 (arrows 34),
the hot air leaves the sleeve via the outlet 114 where it is discharged (arrow 36).

The path of the hot air around the pipework 10 enables the liquid which flows therein to be maintained at a temperature which is sufficiently high to prevent freezing.

Each sleeve 104 is produced, for example, from polyethylene foam.

Figure 3:
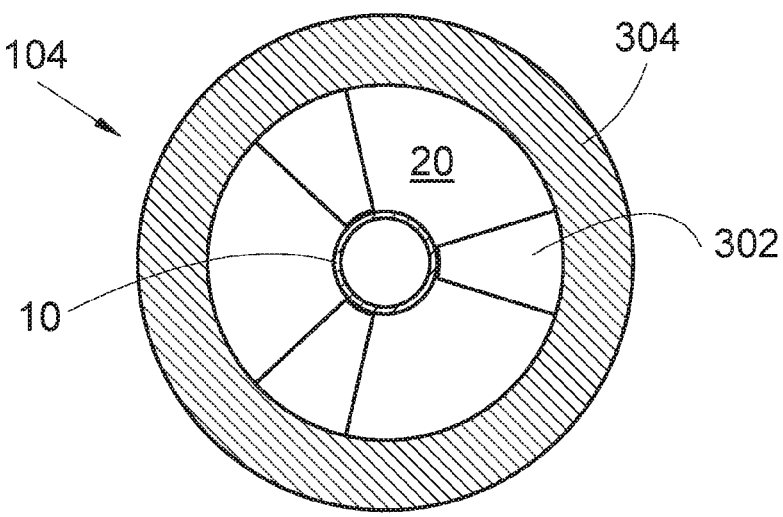
FIG. 3 is a section along the line III-III of FIG. 1.

FIG. 3 shows the sleeve 104 in section through a plane which is perpendicular to the axis thereof.

In the embodiment of the invention which is set out in this instance, the sleeve 104 comprises a tube 304 and studs 302. In order to ensure that the tube 302 is fixed in position, the studs 302 are arranged radially inside the tube 304. The studs 302 thus extend from the inner face of the tube 304 as far as the outer face of the pipework 10. The space 20 is thus defined between the studs 302.

In the embodiment of the invention set out in this instance, there are three rows of studs 302 which are arranged at 120° with respect to each other.

Figure 2:
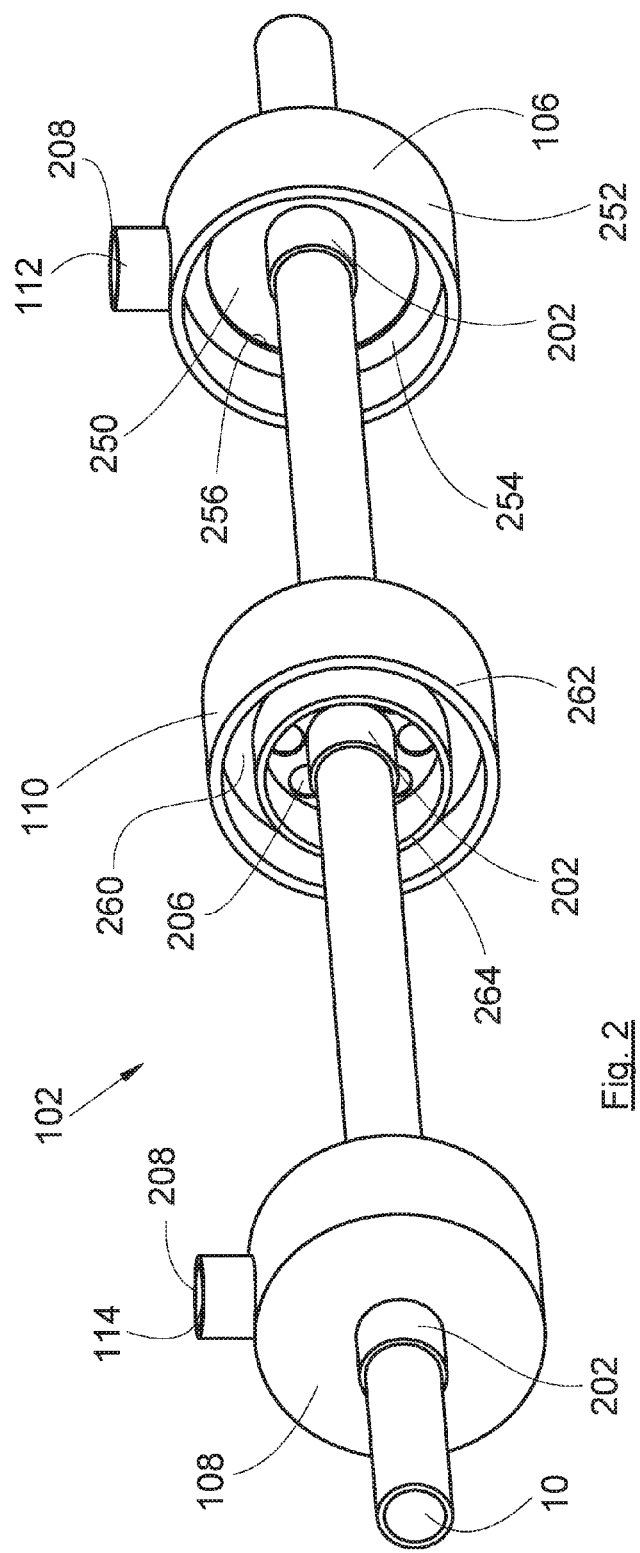
FIG. 2 shows an example of a framework of the antifreeze system of FIG. 1.

FIG. 2 shows the framework 102 without the sleeves 104.

The framework 102 has two end supports 106 and 108, each of which is arranged at one of the ends of the antifreeze system 100, for each pair of sleeves 104, an intermediate support 110 which is arranged between the two sleeves 104 of the pair and which has at least one air duct 206 which is configured to enable the passage of the hot air from one end support 106 to the other end support 108 and, more specifically from the space 20 of one sleeve 104 of the pair to the space 20 of the other sleeve 104 of the pair.

Each end support 106, 108 comprises a hole 208 which constitutes for one the inlet 112 and for the other the outlet 114.

Each support 106, 108, 110 has fixing means 202 which ensure that it is fixed to the pipework 10. The fixing means 202 are in this instance in the form of a collar which is fitted to the pipework 10.

The end supports 106 and 108 are preferably identical, and in this instance only the end support 106 is described.

The end support 106 comprises a base 250 which is fixedly joined to the collar 202 and which extends around the collar 202, a lateral wall 252 which is formed by means of revolution, and is cylindrical in this instance, and which is fixedly joined to the base 250 and which extends from the base 205 parallel with the axis of the collar 202.

Each end support 106, 108 is thus in the form of a vessel which is open and the two vessels face each other via their openings.

The end support 106 also has a ring 254 which is fixed to the inner side of the lateral wall 252 and which is remote from the base 250 and whose inner circle 256 constitutes a free edge, that is to say that it is not in contact either with the pipework 10 or with the collar 202.

The hole 208 which constitutes the inlet 112 in this instance opens at the inner side of the lateral wall 252 between the base 250 and the ring 254.

When the antifreeze system 100 is assembled, the sleeve 104, and more specifically the tube 304, is placed inside the lateral wall 252 and in abutment against the ring 254. In this manner, the air from the inlet 112 flows between the base 250 and the ring 254 passing through the inner circle 256 so as to be introduced into the space 20. In a symmetrical manner, the air present in the space 20 flows, passing through the inner circle 256, between the base 250 and the ring 254, in order to rejoin the outlet 114.

This particular arrangement of each end support 106, 108 prevents the sleeve 104 from blocking the hole 208 since it cannot extend beyond the ring 254.

The intermediate support 110 comprises a base 260 which is fixedly joined to the collar 202 and which extends around the collar 202, a lateral wall 262 which is formed by means of revolution, and is cylindrical in this instance, and which is fixedly joined to the base 260 and which extends at one side and the other of the base 260 parallel with the axis of the collar 202.

The intermediate support 110 is symmetrical relative to the base 260 and is in the form of two vessels which are open with a common base.

At one side and the other of the base 260, the intermediate support 110 also has an intermediate wall 264 which is fixed to the base 260 between the lateral wall 262 and the collar 202.

Each air duct 206 is arranged in the base 260 between the intermediate wall 264 and the collar 202.

When the antifreeze system 100 is assembled, the sleeve 104, and more specifically the tube 304, is placed between the lateral wall 262 and the intermediate wall 264 in abutment against the base 260. In this manner, the air from a space 20 may pass through the base 260 via each air duct 206 which cannot be blocked by the sleeve 104.

Figure 4:
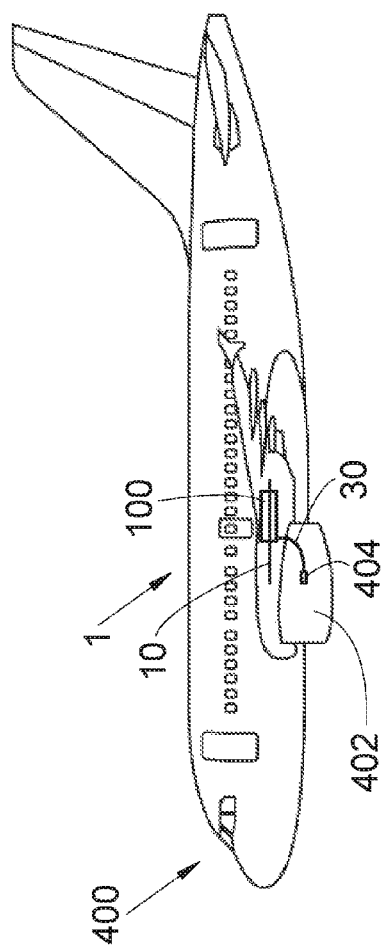
FIG. 4 shows an aircraft comprising an assembly according to the invention.

FIG. 4 shows an aircraft 400 with a jet engine 402 and at least one assembly 1 with a pipework 10 and an antifreeze system 100.

The source 30 of hot air is a pipework which extends from a tap 404 of the jet engine 402 and which enables hot air to be drawn from the jet engine 402.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An antifreeze system for a pipework, the antifreeze system comprising:

a framework configured to be fixed to the pipework,
a source of hot air and
at least one pair of thermally insulating sleeves maintained around the pipework by the framework, each sleeve being configured so that a space is produced between the sleeve and the pipework,
the framework having an inlet and an outlet, which are configured to produce a fluid communication between the outer side of the antifreeze system and the space, and where the inlet is fluidly connected to the source of hot air,
wherein the framework has two end supports, each end support comprising a hole which constitutes for one the inlet and for the other the outlet, and, for each pair of sleeves, an intermediate support which is arranged between the two sleeves and which has at least one air duct which is configured to enable the passage of the hot air from one end support to the other end support,
wherein the intermediate support comprises:
a collar configured to be fitted on the pipework,
a base fixedly joined to the collar and extending around the collar,
a lateral wall formed by means of revolution and being fixedly joined to the base and extending at one side and the other of the base parallel with an axis of the collar, at one side and the other of the base, an intermediate wall fixed to the base between the lateral wall and the collar, and
each air duct being arranged in the base between the intermediate wall and the collar.

2. The antifreeze system according to claim 1, wherein the sleeve comprises a tube and studs which are arranged radially at the inner side of the tube.

3. The antifreeze system according to claim 1, wherein each end support comprises:
a collar configured to be fitted on the pipework,
a base fixedly joined to the collar and extending around the collar,
a lateral wall formed by means of revolution and being fixedly joined to the base and extending from the base parallel with an axis of the collar, and
a ring fixed to the inner side of the lateral wall being remote from the base and whose inner circle constitutes a free edge, and
the hole opening inside the lateral wall between the base and the ring.

4. An assembly comprising:
a pipework and
an antifreeze system comprising:
a framework configured to be fixed to the pipework,
a source of hot air and
at least one pair of thermally insulating sleeves maintained around the pipework by the framework, each sleeve being configured so that a space is produced between the sleeve and the pipework,
the framework having an inlet and an outlet, which are configured to produce a fluid communication between the outer side of the antifreeze system and the space, and where the inlet is fluidly connected to the source of hot air,
wherein the framework has two end supports, each end support comprising a hole which constitutes for one the inlet and for the other the outlet, and, for each pair of sleeves, an intermediate support which is arranged between the two sleeves and which has at least one air duct which is configured to enable the passage of the hot air from one end support to the other end support,
the framework being fixed to the pipework, and
each sleeve being maintained around the pipework,
wherein the intermediate support comprises:
a collar configured to be fitted on the pipework,
a base fixedly joined to the collar and extending around the collar,
a lateral wall formed by means of revolution and being fixedly joined to the base and extending at one side and the other of the base parallel with an axis of the collar, at one side and the other of the base, an intermediate wall fixed to the base between the lateral wall and the collar, and
each air duct being arranged in the base between the intermediate wall and the collar.

5. An aircraft comprising:
a jet engine provided with a tap which is configured to draw hot air from the jet engine,
an assembly comprising:
a pipework and
an antifreeze system comprising:
a framework configured to be fixed to the pipework,
a source of hot air and
at least one pair of thermally insulating sleeves maintained around the pipework by the framework, each sleeve being configured so that a space is produced between the sleeve and the pipework,
the framework having an inlet and an outlet, which are configured to produce a fluid communication between the outer side of the antifreeze system and the space, and where the inlet is fluidly connected to the source of hot air,
wherein the framework has two end supports, each end support comprising a hole which constitutes for one the inlet and for the other the outlet, and, for each pair of sleeves, an intermediate support which is arranged between the two sleeves and which has at least one air duct which is configured to enable the passage of the hot air from one end support to the other end support,
the framework being fixed to the pipework,
each sleeve being maintained around the pipework, and
the source of hot air being a pipework which extends from the tap,
wherein the intermediate support comprises:
a collar configured to be fitted on the pipework,
a base fixedly joined to the collar and extending around the collar,
a lateral wall formed by means of revolution and being fixedly joined to the base and extending at one side and the other of the base parallel with an axis of the collar, at one side and the other of the base, an intermediate wall fixed to the base between the lateral wall and the collar, and
each air duct being arranged in the base between the intermediate wall and the collar.

* * * * *